(12) United States Patent
Yang

(10) Patent No.: US 10,687,142 B2
(45) Date of Patent: Jun. 16, 2020

(54) METHOD FOR INPUT OPERATION CONTROL AND RELATED PRODUCTS

(71) Applicant: Guangdong Oppo Mobile Telecommunications Corp., Ltd., Dongguan, Guangdong (CN)

(72) Inventor: Zongye Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/238,164

(22) Filed: Jan. 2, 2019

(65) Prior Publication Data

US 2019/0306623 A1 Oct. 3, 2019

(30) Foreign Application Priority Data

Mar. 30, 2018 (CN) .......................... 2018 1 0277799

(51) Int. Cl.
*G06F 17/00* (2019.01)
*H04R 3/04* (2006.01)
(Continued)

(52) U.S. Cl.
CPC .............. *H04R 3/04* (2013.01); *G06F 3/165* (2013.01); *G06F 9/3004* (2013.01);
(Continued)

(58) Field of Classification Search
CPC ............................. G06F 3/165; H04R 1/1016
See application file for complete search history.

(56) References Cited

U.S. PATENT DOCUMENTS

| 6,748,089 B1* | 6/2004 | Harris | H03G 3/3026 |
| | | | 381/104 |
| 2005/0074128 A1* | 4/2005 | Bachler | H04R 1/1041 |
| | | | 381/23.1 |

(Continued)

FOREIGN PATENT DOCUMENTS

| CN | 103019379 A | 4/2013 |
| CN | 104581480 A | 4/2015 |

(Continued)

OTHER PUBLICATIONS

Extended European search report issued in corresponding European application No. 19150158.4 dated Jul. 4, 2019.

(Continued)

*Primary Examiner* — Joseph Saunders, Jr.
(74) *Attorney, Agent, or Firm* — Young Basile Hanlon & MacFarlane, P.C.

(57) ABSTRACT

A method for input operation control, a terminal device, and an earphone are provided. The method includes the following. An input operation on an exhaust hole defined in an audio processing device is received. A frequency-response curve associated with an acoustic structure of the audio processing device is acquired according to an audio signal currently played by the audio processing device. The input operation is recognized according to the frequency-response curve, and a control instruction corresponding to the input operation is generated. A terminal device in communication with the audio processing device is controlled according to the control instruction.

17 Claims, 8 Drawing Sheets

(51) Int. Cl.
*G06F 3/16* (2006.01)
*G06F 9/30* (2018.01)
*H04R 1/10* (2006.01)

(52) U.S. Cl.
CPC ......... *H04R 1/1016* (2013.01); *H04R 1/1041* (2013.01); *H04R 2430/01* (2013.01); *H04R 2460/11* (2013.01)

(56) References Cited

U.S. PATENT DOCUMENTS

| | | | | |
|---|---|---|---|---|
| 2005/0238190 | A1* | 10/2005 | Rohrlein | H03G 3/04 381/312 |
| 2006/0215847 | A1* | 9/2006 | Hollemans | H04R 1/1041 381/74 |
| 2010/0040239 | A1* | 2/2010 | Fretz | H04R 25/453 381/60 |
| 2011/0142269 | A1* | 6/2011 | Fretz | H04R 25/50 381/314 |
| 2016/0165035 | A1 | 6/2016 | Chang | |
| 2016/0295314 | A1* | 10/2016 | Jaques | H04R 1/1041 |
| 2016/0373872 | A1 | 12/2016 | Chen et al. | |
| 2017/0110124 | A1 | 4/2017 | Boesen et al. | |

FOREIGN PATENT DOCUMENTS

| | | |
|---|---|---|
| CN | 105992092 A | 10/2016 |
| CN | 106341535 A | 1/2017 |
| CN | 107450940 A | 12/2017 |
| CN | 107580098 A | 1/2018 |
| WO | 2012149970 A1 | 11/2012 |

OTHER PUBLICATIONS

International search report issued in corresponding international application No. PCT/CN2019/075484 dated May 8, 2019.

* cited by examiner

US 10,687,142 B2

METHOD FOR INPUT OPERATION CONTROL AND RELATED PRODUCTS

CROSS-REFERENCE TO RELATED APPLICATION(S)

This application claims priority to Chinese Patent Application Serial No. 201810277799.7, filed on Mar. 30, 2018, the entire disclosure of which is hereby incorporated by reference.

TECHNICAL FIELD

This disclosure relates to the technical field of communication, and more particularly to a method for input operation control, a terminal device, and an earphone.

BACKGROUND

With intelligent development of communication devices, smart terminal devices are used more and more frequently in daily life. Various activities such as video communication, calling, voice communication, music listening, video playback, and the like can be carried out by the smart terminal device. Sounds output by the terminal device can be received by an earphone worn on a user. When the user listens to music or answers a call via the earphone, some control operations such as playing, pausing, adjusting volume, switching songs, and opening a contact list may be involved. Generally, these control operations can be realized by performing operations on a related page of a corresponding application in the terminal device, or on preset control buttons of the earphone.

However, in some application scenarios, for example, the user is in a motion state, the terminal device is placed in the user's pocket, and the terminal device is in a screen-off state, it is inconvenient for the user to perform operations on the terminal device. When performing operations on the preset control buttons of the earphone, the user needs to find a wired control button or a touch button disposed at a certain position of the earphone, and then performs a corresponding operation, which is prone to trigger a wrong control operation, thereby reducing operation efficiency. In addition, more and more users use earphones without control buttons, such that controls on applications of the terminal device cannot be realized quickly and conveniently through the user operations, thereby bringing inconvenience to the users.

SUMMARY

Implementations of the present disclosure provide a method for input operation control, an earphone, and a terminal device.

According to a first aspect, a method for input operation control is provided. The method includes the following.

An input operation on an exhaust hole defined in an audio processing device is received. A frequency-response curve associated with an acoustic structure of the audio processing device is acquired according to an audio signal currently played by the audio processing device. The input operation is recognized according to the frequency-response curve and a control instruction corresponding to the input operation is generated. A terminal device in communication with the audio processing device is controlled according to the control instruction.

According to a second aspect, an earphone is provided. The earphone includes at least one processor and a computer readable memory coupled with the at least one processor and storing at least one computer executable instruction therein which, when executed by the at least one processor, causes the at least one processor to perform the following. An input operation on an exhaust hole defined in an audio processing device is received. A frequency-response curve associated with an acoustic structure of the audio processing device is acquired according to an audio signal currently played by the audio processing device. The input operation is recognized according to the frequency-response curve and a control instruction corresponding to the input operation is generated. A terminal device in communication with the audio processing device is controlled according to the control instruction.

According to a third aspect, a terminal device is provided. The terminal device includes at least one processor and a computer readable memory coupled with the at least one processor and storing at least one computer executable instruction therein which, when executed by the at least one processor, causes the at least one processor to perform the following. An input operation on an exhaust hole defined in an audio processing device in communication with the terminal device is received. A frequency-response curve associated with an acoustic structure of the audio processing device is acquired according to an audio signal currently played by the audio processing device. The input operation is recognized according to the frequency-response curve and a control instruction corresponding to the input operation is generated. An instruction interactive operation is performed according to the control instruction.

BRIEF DESCRIPTION OF DRAWINGS

To illustrate the technical solutions embodied by the implementations of the present disclosure more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1:
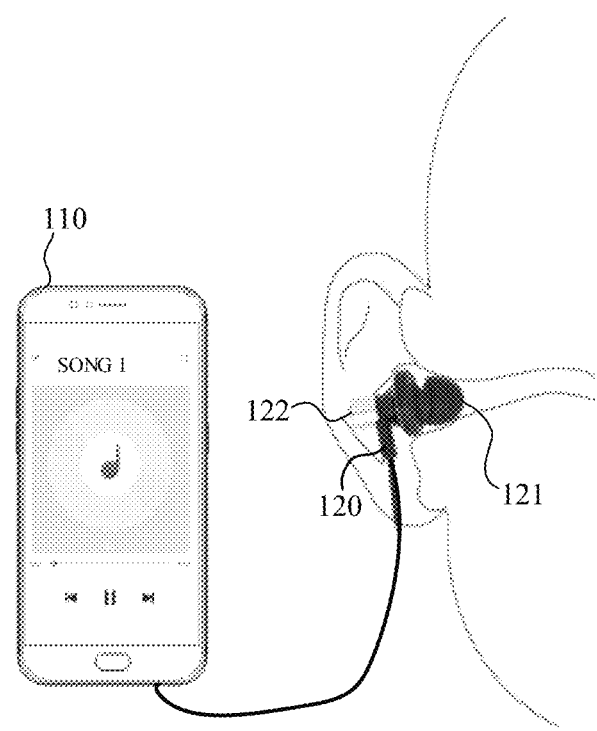
FIG. 1 is a schematic diagram illustrating an application scenario of a method for input operation control according to an implementation of the present disclosure.

To illustrate objectives, technical solutions, and advantages of the present disclosure more clearly, the following will further illustrate the present disclosure in detail through implementations with reference to the accompanying drawings. It will be appreciated that the implementations are described herein for the purpose of explaining the present disclosure rather than limiting the present disclosure.

All technical and scientific terms used herein have the same meaning as commonly understood by those of ordinary skill in the art to which this disclosure applies, unless otherwise defined. The terms used herein are merely for the purpose of describing particular implementations, and not intended to limit the present disclosure.

According to a first aspect, a method for input operation control is provided. The method includes the following. An input operation on an exhaust hole defined in an audio processing device is received. A frequency-response curve associated with an acoustic structure of the audio processing device is acquired according to an audio signal currently played by the audio processing device. The input operation is recognized according to the frequency-response curve and a control instruction corresponding to the input operation is generated. A terminal device in communication with the audio processing device is controlled according to the control instruction.

In one implementation, acquiring the frequency-response curve associated with the acoustic structure of the audio processing device according to the audio signal currently played by the audio processing device includes the following. The audio signal currently played by the audio processing device is acquired. Frequency and amplitude of the audio signal are analyzed. The frequency-response curve is established according to the frequency and amplitude of the audio signal.

In one implementation, recognizing the input operation according to the frequency-response curve includes the following. The input operation is recognized according to the frequency-response curve and a mapping relationship between input operations and a plurality of preset frequency-response curves stored in a preset database. Generating the control instruction corresponding to the input operation includes the following. The control instruction corresponding to the input operation is generated according to the input operation and a corresponding relationship between input operations and control instructions.

In one implementation, the input operation is at least one of covering the exhaust hole for a preset duration and performing covering the exhaust hole for preset times within a preset period.

In one implementation, receiving the input operation on the exhaust hole defined in the audio processing device includes the following. A vibration signal of the audio processing device is acquired. Whether the vibration signal is generated by the input operation on the exhaust hole defined in the audio processing device is determined according to feature information of the vibration signal.

In one implementation, determining the frequency-response curve associated with the acoustic structure of the audio processing device according to the audio signal currently played by the audio processing device includes the following. The frequency-response curve associated with the acoustic structure of the audio processing device is determined according to the audio signal currently played by the audio processing device, based on a determination that the vibration signal is generated by the input operation.

In one implementation, controlling the terminal device in communication with the audio processing device according to the control instruction includes the following. Control information contained in the control instruction is recognized to determine a preset application to be controlled and an instruction interactive operation to be performed. The preset application is controlled to perform the instruction interactive operation.

In one implementation, the instruction interactive operation includes at least one of playing music, pausing music, switching songs, adjusting volume, opening a preset application, and activating a voice assistant.

According to a second aspect, an earphone is provided. The earphone includes at least one processor and a computer readable memory coupled with the at least one processor and storing at least one computer executable instruction therein which, when executed by the at least one processor, causes the at least one processor to carry out the following actions. An input operation on an exhaust hole defined in an audio processing device is received. A frequency-response curve associated with an acoustic structure of the audio processing device is acquired according to an audio signal currently played by the audio processing device. The input operation is recognized according to the frequency-response curve and a control instruction corresponding to the input operation is generated. A terminal device in communication with the audio processing device is controlled according to the control instruction.

According to a third aspect, a terminal device is provided. The terminal device includes at least one processor and a computer readable memory coupled with the at least one processor and storing at least one computer executable instruction therein which, when executed by the at least one processor, causes the at least one processor to carry out the following actions. An input operation on an exhaust hole defined in an audio processing device in communication with the terminal device is received. A frequency-response curve associated with an acoustic structure of the audio processing device is acquired according to an audio signal currently played by the audio processing device. The input operation is recognized according to the frequency-response curve and a control instruction corresponding to the input operation is generated. An instruction interactive operation is performed according to the control instruction.

FIG. 1 is a schematic diagram illustrating an application scenario of a method for input operation control according to an implementation of the present disclosure. As illustrated in FIG. 1, the application scenario includes a terminal device 110 and an audio processing device 120 in communication with the terminal device 110. The audio processing device 120 may be an earphone. It can be understood that the audio processing device 120 may also be other devices with an audio processing function.

The terminal device 110 is configured to play an audio signal, and the audio signal includes but not limited to songs, video sounds, call voices, and the like, and the terminal device 110 is in communication with the audio processing device 120. The audio processing device 120 may be an in-ear earphone, an earplug earphone, a head-mounted earphone, and the like. The terminal device 110 and the audio processing device 120 can implement data transmission via wired or wireless communication.

The audio processing device 120 includes an electroacoustic transducer 121 disposed at a tip portion of the audio processing device 120. When the tip portion of the audio processing device 120 is placed in an ear canal of a user, the electroacoustic transducer 121 can output the audio signal played by the terminal device 110 into the ear canal of the user. The electroacoustic transducer 121 includes a speaker and a microphone, where the speaker is configured to play the audio signal sent by the terminal device 110, and the microphone is configured to record an audio signal around the audio processing device 120. In one implementation, the microphone can also collect an acoustic echo signal formed by reflection and vibration of the audio signal through the ear canal. In one implementation of the present disclosure, the speaker is integrated with the microphone.

A shell of the audio processing device 120 defines an exhaust hole 122 for balancing air pressure. The exhaust hole 122 can be configured to exhaust air in the user's ear canal. By adjusting a size and shape of the exhaust hole 122, a substantially consistent frequency response can be acquired when the earphone is worn by different users and/or positioned in different positions of the ear of the user.

Figure 2:
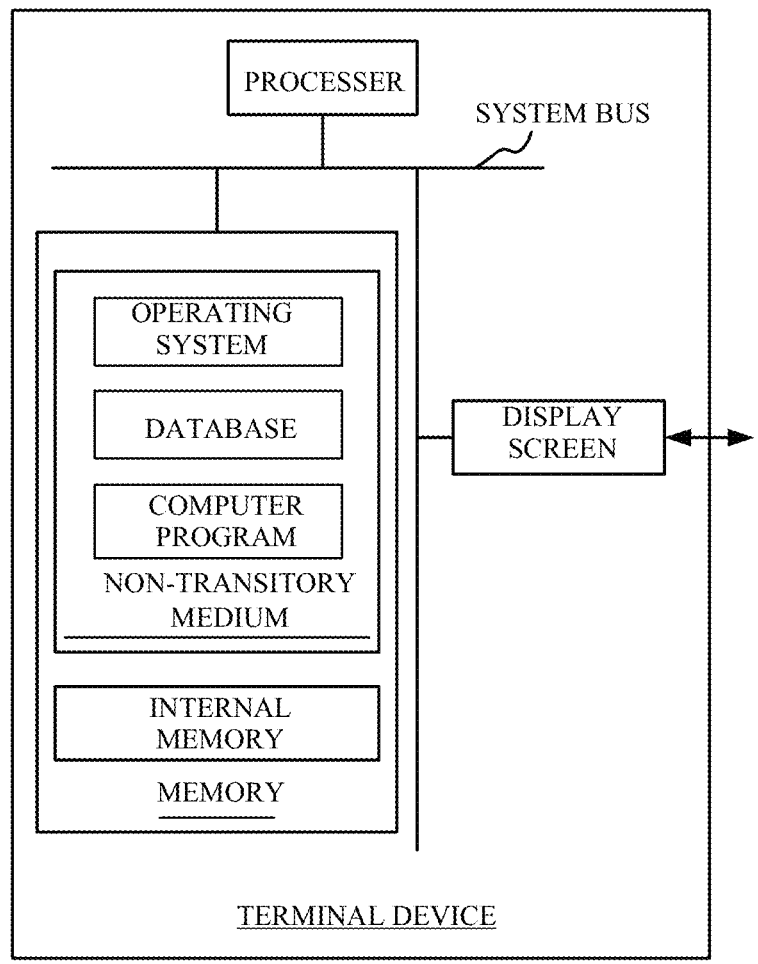
FIG. 2 is a schematic structural diagram illustrating an inner structure of a terminal device according to an implementation of the present disclosure.

FIG. 2 is a schematic structural diagram illustrating an inner structure of a terminal device according to an implementation of the present disclosure. The terminal device 110 includes a processor, a memory, and a display screen which are coupled with each other via a system bus. The processor is configured to provide computing and control capabilities to support operation of the terminal device 110. The memory is configured to store data, programs, and/or instruction codes, and the like. The memory stores at least one computer program which can be executed by the processor to implement the method for input operation control which is applicable to the terminal device 110 according to the implementations of the present disclosure. The memory may include a non-transitory storage medium such as a magnetic disk, an optical disk, and a read-only memory (ROM), or may include a random access memory (RAM). In one implementation, the memory includes a non-transitory storage medium and an internal memory. The non-transitory storage medium is configured to store an operating system, a database, and computer programs. Data associated with the method for input operation control according to the implementations of the present disclosure are stored in the database. The computer programs can be executed by the processor to implement the method for input operation control according to the implementations of the present disclosure. The internal memory provides a caching operating environment for the operating system, the database, and the computer programs in the non-transitory storage medium. The display screen may be a touch screen such as a capacitive screen and an electronic screen, and is configured to display interface information of the terminal device 110. The display screen can be operable in a screen-on state and a screen-off state. The terminal device 110 may be a mobile phone, a tablet computer, a personal digital assistant (PDA), a wearable device, and the like.

Those skilled in the art can understand that the structure illustrated in FIG. 2 is only part of structure related to the technical solutions of the present disclosure, and does not constitute any limitation on the terminal device 110 to which the technical solutions of the present disclosure are applied. The terminal device 110 may include more or fewer components than illustrated in the figure or be provided with different components, or certain components can be combined.

In one implementation of the present application, a method for input operation control is provided, and the method is applied to the audio processing device that is in communication with the terminal device. The audio processing device is described in detail hereinafter by taking the earphone as an example. It can be understood that the audio processing device may also be other devices having the audio processing function, which are not repeatedly described in the implementations of the present application.

Figure 3:
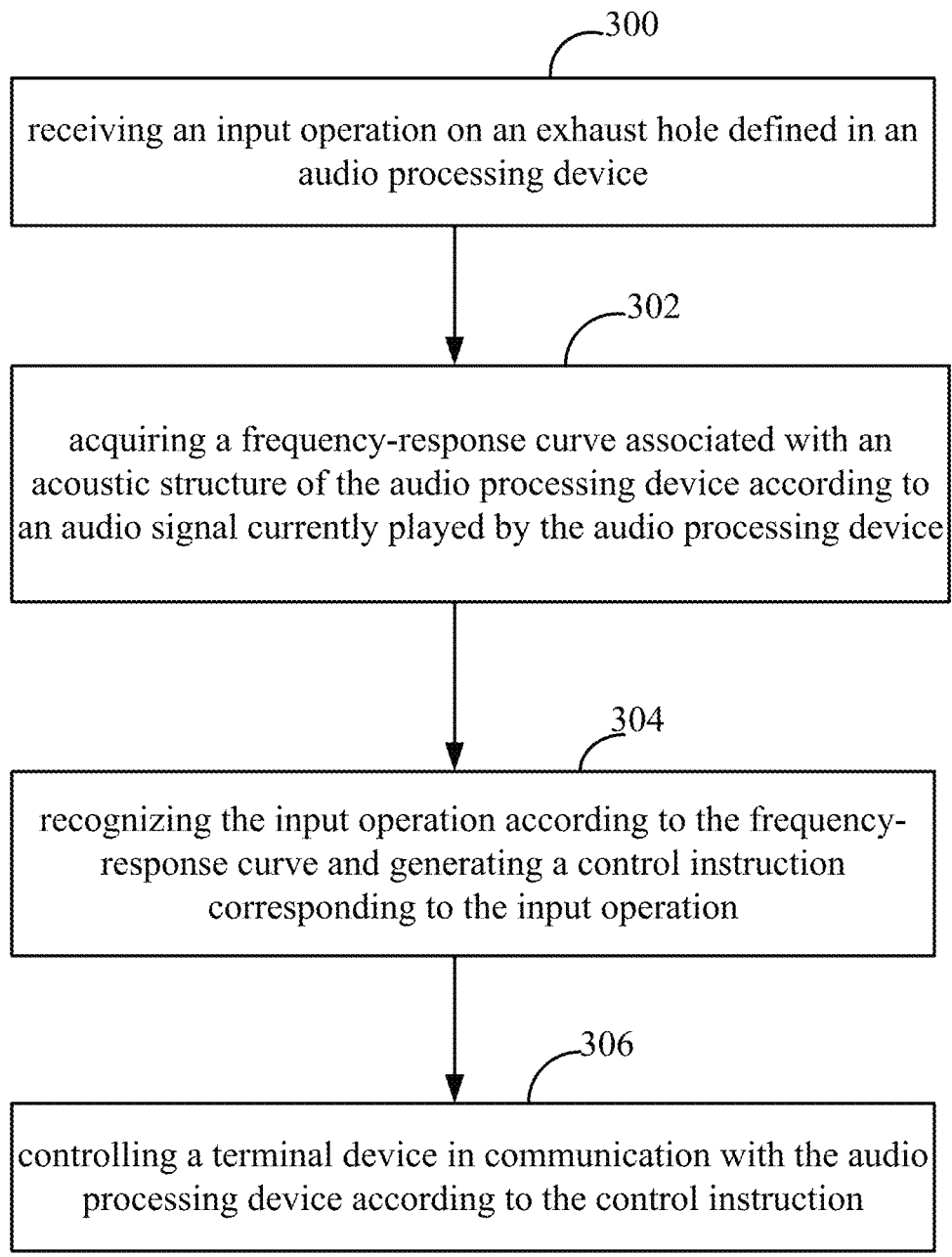
FIG. 3 is a schematic flow chart illustrating a method for input operation control according to an implementation of the present disclosure.

FIG. 3 is a schematic flow chart illustrating a method for input operation control according to an implementation of the present disclosure. Take being executed by the audio processing device illustrated in FIG. 1 as an example, the method for input operation control according to the implementation is illustrated. The method begins at block 300.

At block 300, an input operation on the exhaust hole defined in the audio processing device is received.

At block 302, a frequency-response curve associated with an acoustic structure of the audio processing device is acquired according to an audio signal currently played by the audio processing device.

When the user uses the earphone to listen to music, watch video or answer a call, the user can perform the input operation such as covering, blocking, and pressing on the exhaust hole defined in the shell of the earphone. In one implementation, the input operation includes but not limited to covering the exhaust hole for a preset duration and performing covering the exhaust hole preset times (e.g., twice) within a preset period.

When the earphone receives the input operation, the frequency-response curve associated with the acoustic structure of the earphone can be acquired according to the audio signal currently played by the earphone. A frequency response refers to a phenomenon in which a sound pressure generated by the earphone increases or decreases with the change of a frequency and a phase changes with the frequency, when the audio signal outputted at a constant voltage is connected to a system. A variation relationship between the sound pressure and the frequency and a variation relationship between the phase and the frequency are called as the frequency response. Since the exhaust hole defined in the earphone can exhaust air in the ear canal of the user, when the exhaust hole is covered by the user, the acoustic structure of the earphone changes, and an air pressure in the ear canal of the user changes, resulting in a change of the frequency response in the ear canal of the user. That is, the frequency-response curve can be used to indicate the change of the acoustic structure of the earphone.

For example, when the user performs the input operation on the earphone (for example, when the exhaust hole is blocked), the acoustic structure of the earphone changes. By acquiring frequency and amplitude of the audio signal currently played by the earphone, the frequency-response curve can be established according to the frequency and amplitude of the audio signal.

It is to be understood that, the audio signal may be a multimedia file currently played, a voice signal of the user himself/herself or a contact during the call, or an audio signal beyond the normal human hearing range (the audio signal higher than 20 KHz) and cannot be heard by the user even if the earphone is positioned in the ear of the user.

At block 304, the input operation is recognized according to the frequency-response curve, and a control instruction corresponding to the input operation is generated.

According to a pre-stored mapping relationship between frequency-response curves and input operations, a corresponding input operation can be recognized according to a current frequency-response curve, and the control instruction corresponding to the input operation currently recognized is generated according to the input operation and a corresponding relationship between input operations and control instructions. The control instruction is configured to control the terminal device in communication with the earphone to perform a corresponding instruction interactive operation.

For example, a preset database for storing multiple preset frequency-response curves is established, and a mapping relationship between the multiple preset frequency-response curves and corresponding input operations is established. When the frequency-response curve is matched with one of the multiple preset frequency-response curves in the preset database, the input operation corresponding to the frequency-response curve is recognized according to the mapping relationship. The input operation may be blocking the exhaust hole defined in the earphone, blocking the exhaust hole for a preset duration, blocking the exhaust hole preset times, or the like. The control instruction can be recognized and executed according to the input operation recognized.

At block 306, the terminal device in communication with the audio processing device is controlled according to the control instruction.

In one implementation, the control instruction acquired is transmitted to the terminal device in communication with the earphone, and the terminal device is directed to perform the instruction interactive operation corresponding to the control instruction. The instruction interactive operation includes but not limited to playing music, pausing music, switching songs, adjusting volume, opening a preset application, and activating a voice assistant. In addition, the instruction interactive operation may also be searching, bookmarking, downloading, or sharing the audio signal currently played, and may also be initiating a call, ending a call, recording, and the like. Certainly, operations contained in the instruction interactive operation may be added or reduced according to the user's usage habits, and the present disclosure is not limited thereto.

For example, the control instruction recognized by the earphone is configured to control a preset application in the terminal device to perform a corresponding operation. The preset application may be a music player, a video player, a radio player, a calling application, or the like. The preset application may also be a voice assistant. The terminal device can be controlled to perform operations by activating the voice assistant to recognize the user's voice instructions. It can be understood that the implementation is not limited to the above examples. Herein not all examples are enumerated.

According to the above-mentioned method for input operation control, when the input operation on the exhaust hole defined in the audio processing device is received, the frequency-response curve associated with the acoustic structure of the audio processing device is acquired according to the audio signal currently played by the audio processing device. The input operation is recognized according to the frequency-response curve, and the control instruction corresponding to the input operation is generated. The terminal device in communication with the audio processing device is controlled according to the control instruction, and the instruction interactive operation corresponding to the control instruction is performed. By the above-mentioned method, the instruction interactive operation for the terminal device can be realized according to the input operation on the exhaust hole defined in the audio processing device, thereby realizing convenient and quick user operations, and improving use efficiency and user experience.

What needs to be illustrated is that a method similar to the above illustrated method can by implemented by the terminal device, that is, the terminal device receives the input operation, acquires the frequency-response curve, recognizes the input operation, generates the control instruction, and performs an instruction interactive operation according to the control instruction.

Figure 4:
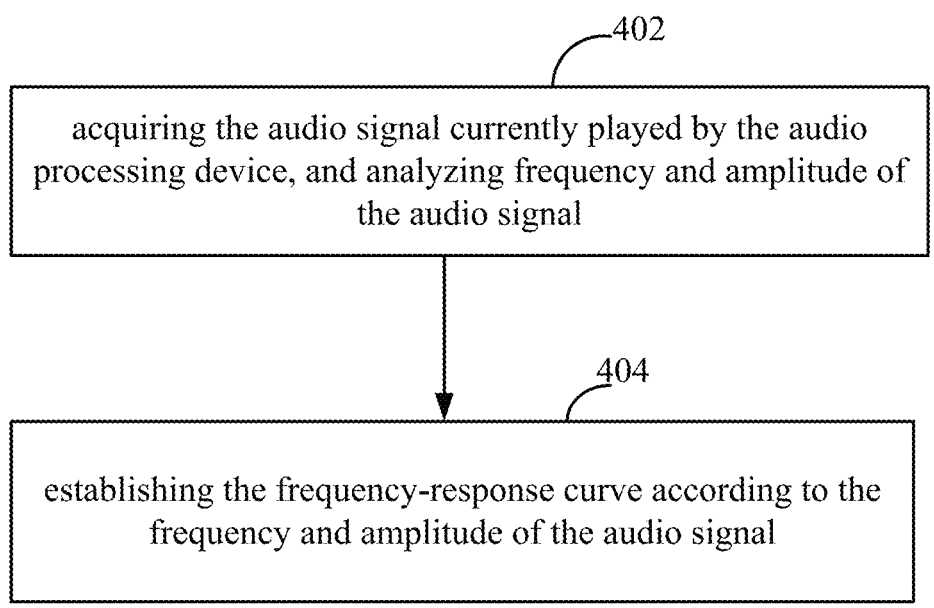
FIG. 4 is a schematic flow chart illustrating acquiring, according to the audio signal currently played by the audio processing device, a frequency-response curve associated with an acoustic structure of an audio processing device according to an implementation of the present disclosure.

In one implementation, as illustrated in FIG. 4, acquiring the frequency-response curve associated with the acoustic structure of the audio processing device according to the audio signal currently played by the audio processing device includes operations at block 402 and 404.

At block 402, the audio signal currently played is acquired by the audio processing device, and frequency and amplitude of the audio signal are analyzed.

The audio signal currently played by the earphone is acquired. The audio signal is an information carrier containing variation of frequency and amplitude of a regular sound wave, where the sound wave contains voice, music and sound effects. The audio signal may be a music signal or sound signal outputted by playing a multimedia file by the preset application, or a sound signal beyond the user's hearing range. The audio signal may also be a voice signal of the user himself/herself or a contact during the call.

In one implementation, the electroacoustic transducer in the earphone can be configured as a speaker to convert an electrical signal corresponding to the audio signal into an acoustic wave signal that can be heard by the user. The electroacoustic transducer is sensitive to acoustic waves in an internal structure (ear canal) of the user's ear. The acoustic waves can cause the vibration of a speaker cone and drive a coil connected to the speaker cone to perform motion of cutting magnetic lines in a magnetic field of a permanent magnet, thereby inducing a current that varies with the acoustic waves (physically called electromagnetic induction). In addition, an electromotive force of the audio signal is output at both ends of the coil. Therefore, the electroacoustic transducer can also record the acoustic echo signal formed by the reflection and vibration of the audio signal through the internal structure of the user's ear, where the audio signal is played by the speaker. In other words, the electroacoustic transducer can be used as a microphone. The principle of the microphone is that after the electroacoustic transducer performing the energy reverse conversion, the electroacoustic transducer converts an acoustic signal into mechanical vibration and then converts the mechanical vibration into an electrical signal, thereby realizing collection of the echo signal. In this implementation, the audio signal currently played by the earphone is acquired by configuring the electro-acoustic transducer as the microphone.

Although different in types, functions or operating conditions, electroacoustic transducers all include two basic components, that is, an electrical system and a mechanical vibration system. Inside the electroacoustic transducer, the electrical system and the mechanical vibration system are coupled with each other through some physical effect to realize energy conversion. The audio signal currently displayed by the earphone can be recorded by the electroacoustic transducer that is configured to play the audio signal, thus there is no need to provide an additional microphone for the earphone to collect the acoustic echo signal, thereby saving cost and simplifying the internal structure of the earphone.

In one implementation, the audio signal currently displayed by the earphone may also be collected by a microphone disposed in the earphone. When the earphone is positioned in the user's ear, the microphone is positioned at a side of the earphone that is in contact with the internal structure of the user's ear, that is, the microphone is disposed on the shell of the earphone in which a through hole for a speaker is defined.

In one implementation, the frequency and amplitude of the audio signal are analyzed. Since frequency-response characteristic is associated with the frequency, the sound pressure, and the phase of the audio signal, a current frequency response of the earphone can be obtained by analyzing the frequency and amplitude of the audio signal played by the earphone.

At block 404, the frequency-response curve is established according to the frequency and amplitude of the audio signal.

The frequency-response curve indicates gain variation with respect to frequency. Any audio equipment or carrier (that is, the object that records sound signals) has its frequency-response curve. For example, a Nyquist diagram, a Bode diagram, and a Nichols diagram can be established to analyze the frequency-response curve of the audio signal. When adopting the Bode diagram to analyze the frequency-response curve of the audio signal, the abscissa (x-axis) of the diagram represents the frequency, usually ranging from 20 Hz to 20 kHz, in Hertz (Hz or KHz), and the ordinate (y-axis) represents the sound pressure (sensitivity), that is, the amplitude, in decibels (dB).

In one implementation, the frequency-response curve of the earphone is established by acquiring the frequency and amplitude of the audio signal currently played by the earphone. When the user's input operation on the exhaust hole defined in the earphone is received, the acoustic structure of the earphone is enabled to change, and the air pressure in the ear canal of the user changes, thereby causing the change of the frequency response within the ear canal of the user. That is, the user's input operation on the exhaust hole in the earphone can be recognized by analyzing the change of the frequency-response curve of the earphone.

Figure 5:
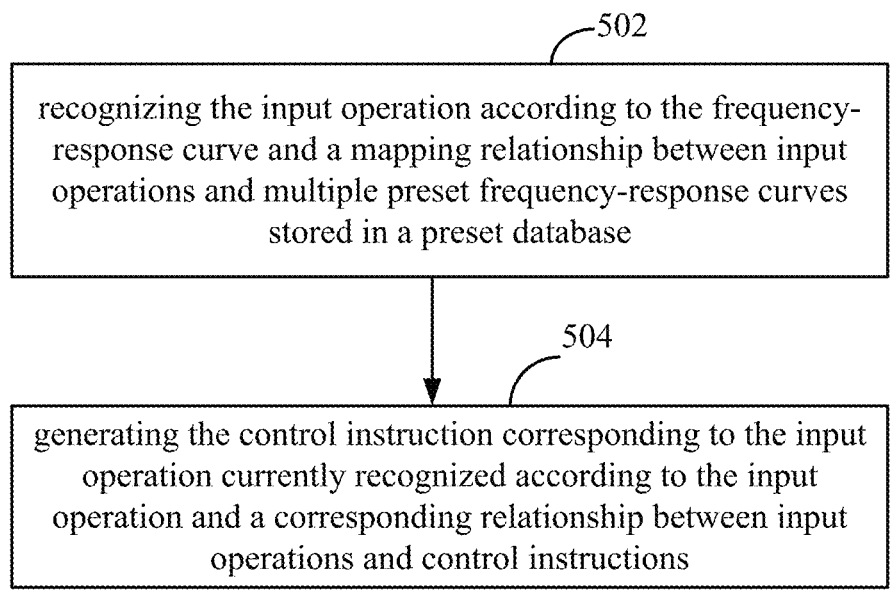
FIG. 5 is a schematic flow chart illustrating recognizing an input operation according to a frequency-response curve and generating a control instruction corresponding to the input operation according to an implementation of the present disclosure.

In one implementation, as illustrated in FIG. 5, recognizing the input operation according to the frequency-response curve and generating the control instruction corresponding to the input operation include operations at block 502 and 504.

At block 502, the input operation is recognized according to the frequency-response curve and a mapping relationship between input operations and multiple preset frequency-response curves stored in a preset database.

The preset frequency-response curves can be acquired by simulating user's input operations on the exhaust hole defined in the earphone. Since each frequency-response curve can indicate the acoustic structure of the earphone, the method for input operation control further includes the following before executing the above-mentioned method. The user's input operation is received, and the frequency-response curve corresponding to the input operation is recorded and stored in the preset database. In one implementation, the terminal device may display an interface for prompting the user to set an input operation and providing options of execution steps needed by the user and step-by-step guidance. For example, when an operation of covering the exhaust hole for one second is set by the user to pause/play music, the user is prompted to place the earphone in the ear canal of the user, use a finger to lightly touch the exhaust hole in the earphone for one second, and confirm that the earphone can realize function of pausing/playing music, etc.

In the process of recording one frequency-response curve corresponding to one input operation of the user, recognition of the input operation of the user can be automatically adjusted according to the user's usage habits. For example, a duration that the user touches the exhaust hole can be adjusted to be within a threshold range to enhance a rate of successfully recognizing the user's input operation. The system records the frequency-response curves corresponding to the input operations of the user, and stores the frequency-response curves in the preset database to be acted as preset frequency-response curves. In one implementation, the system may record one or more preset frequency-response curves according to one input operation, and establish a mapping relationship between each preset frequency-response curve and the input operation.

In one implementation, the frequency-response curve of the earphone currently acquired is compared with the multiple preset frequency-response curves in the preset database. When the frequency-response curve currently acquired is matched with one of the multiple preset frequency-response curves, the input operation corresponding to the frequency-response curve can be recognized according to the mapping relationship between the one of the preset frequency-response curves and the input operation. The input operation includes at least one of covering the exhaust hole for a preset period and performing covering the exhaust hole preset times (e.g., twice) within a preset period.

At block 504, the control instruction corresponding to the input operation currently recognized is generated according to the input operation and a corresponding relationship between input operations and control instructions.

Figure 6:
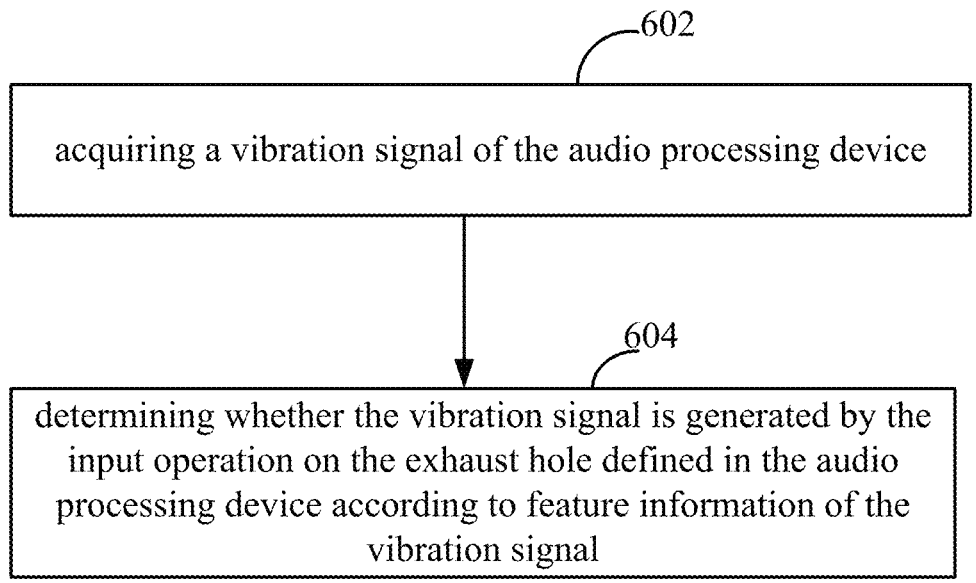
FIG. 6 is a schematic flow chart illustrating receiving an input operation on an exhaust hole defined in an audio processing device according to an implementation of the present disclosure.

In one implementation, as illustrated in FIG. 6, receiving the input operation on the exhaust hole defined in the audio processing device includes the following.

At block 602, a vibration signal of the audio processing device is acquired.

In one implementation, the input operation on the exhaust hole defined in the shell of the earphone may be covering, blocking, pressing, or the like. The electroacoustic transducer for playing an audio signal can acquire a sound signal generated by the covering, blocking, pressing, or the like, and the sound signal can be taken as a vibration signal. Since the covering, the blocking, or the pressing is of short duration and the vibration signal is transmitted through the earphone in the form of a solid, the vibration signal generated by the covering, the blocking, or the pressing is different from a vibration signal generated by other forces or a vibration signal generated by an external vibration source transmitted through the earphone.

At block 604, whether the vibration signal is generated by the user's input operation on the exhaust hole defined in the audio processing device is determined according to feature information of the vibration signal.

Since the earphone is built with the electroacoustic transducer, the vibration signal can be converted into an analog electronic signal via the electroacoustic transducer, and then the analog electronic signal is converted into a digital signal, to acquire feature information of the digital signal. The feature information of the digital signal contains vibration frequency and vibration amplitude. In addition, other feature information may also be contained.

According to the feature information of the digital signal, whether the vibration signal is generated by the user's input operation on the exhaust hole of the earphone can be determined. In one implementation, whether the feature information of the digital signal satisfies a preset condition is determined. The preset condition may contain preset vibration frequency and preset vibration amplitude. When the feature information acquired satisfies the preset condition, the vibration signal is determined to be generated by the user's input operation.

When the vibration signal is generated by the input operation on the exhaust hole defined in the earphone, the frequency-response curve associated with the acoustic structure of the audio processing device is determined according to the audio signal currently played by the audio processing device.

According to the method for input operation control in the implementation of the present disclosure, a wrong operation triggered by any input operation can be avoided, and the user's input operation can be recognized accurately.

Alternatively, the vibration signal of the earphone may also be acquired through a three-axis inertial sensor built in the earphone. The vibration signal can be understood as posture information indicating movement of the earphone due to the covering, blocking, or pressing. When the vibration signal is the posture information of the earphone, the feature information of the vibration signal can be understood as three-axis acceleration information of the earphone. When the three-axis acceleration information acquired satisfies a preset three-axis acceleration condition, the vibration signal can be determined to be generated by the user's input operation.

Figure 7:
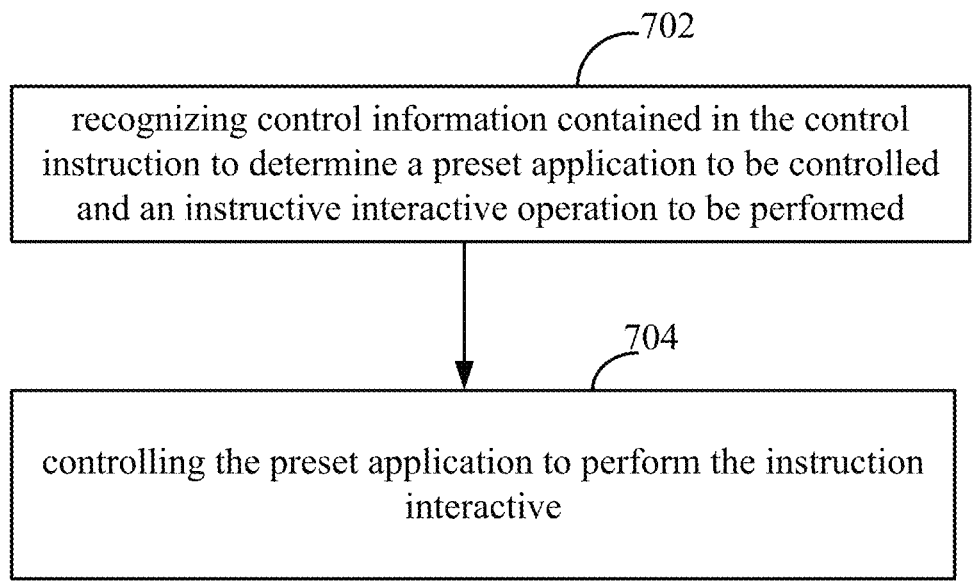
FIG. 7 is a schematic flow chart illustrating controlling a terminal device in communication with an audio processing device according to a control instruction according to an implementation of the present disclosure.

In one implementation, as illustrated in FIG. 7, controlling the terminal device in communication with the audio processing device according to the control instruction include the following.

At block 702, control information contained in the control instruction is recognized to determine a preset application to be controlled and an instructive interactive operation to be executed.

The control information contains an application to be controlled and a control operation needed to be implemented. The preset application may be a music player, a video player, a radio player, or the like. The preset application may also be a calling application, for example, telephone dialing, a contact, call records, and the like. The application may also be a voice assistant, and the terminal device can be controlled by activating the voice assistant to recognize the user's voice instructions.

At block 704, the preset application is controlled to execute the corresponding instruction interactive operation.

For example, if the application type of the preset application to be controlled is a music player, and the input operation is blocking the exhaust hole for three seconds, the corresponding control instruction is opening the music player, and the system opens a default music player in the terminal device according to the control instruction. In one implementation, the instruction interactive operation executed by the terminal device includes but not limited to playing music, pausing music, switching songs, adjusting volume, opening a preset application, and activating a voice assistant. In addition, the instruction interactive operation may also be searching, bookmarking, downloading, or sharing the audio signal currently played, and may also be initiating a call, ending a call, recording, and the like.

What needs to be illustrated is that the mapping relationship between control instructions and input operations, and the correspondence relationship between control instructions and instruction interactive operations may be set according to the user's usage habits, and the present disclosure is not limited thereto.

The method for input operation control illustrated in the foregoing implementations can realize control of the applications of the terminal device in communication with the audio processing device according to the user's input operation on the audio processing device, thereby realizing diversified control and improving the user experience.

It is to be understood that although various operations in the flow charts corresponding to the implementations are sequentially displayed by arrows, these operations are not necessarily performed in an order indicated by the arrows. Except as explicitly stated herein, the execution of these operations is not strictly limited, and these operations may be performed in other orders. Moreover, at least part of the operations in FIGS. 3 to 7 may include multiple sub-operations or multiple stages, which are not necessarily performed at the same time, and can be performed at different times, these sub-operations or stages are not necessarily performed sequentially, and can be performed in turn or alternately with at least part of other operations or sub-operations or stages of other operations.

Figure 8:
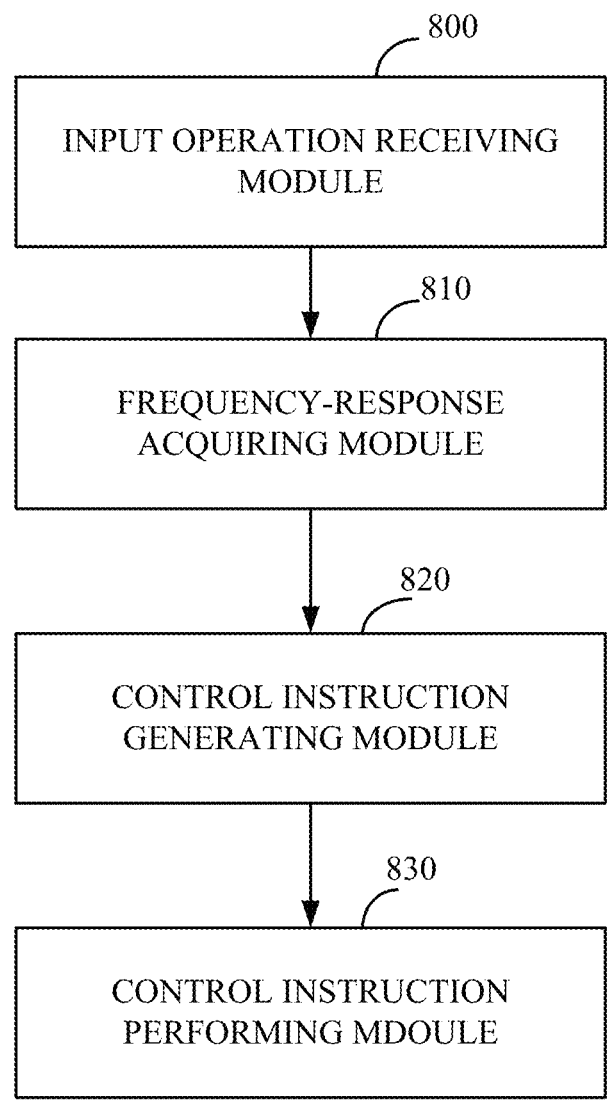
FIG. 8 is a schematic structural diagram illustrating a device for input operation control according to an implementation of the present disclosure.

As illustrated in FIG. 8, in one implementation, a device for input operation control is provided. The device includes an input operation receiving module 800, a frequency-response acquiring module 810, a control instruction generating module 820, and a control instruction performing module 830.

The input operation receiving module 800 is configured to receive an input operation on an exhaust hole defined in an audio processing device.

The frequency-response acquiring module 810 is configured to acquire a frequency-response curve associated with an acoustic structure of the audio processing device according to an audio signal currently played by the audio processing device.

The control instruction generating module 820 is configured to recognize the input operation according to the frequency-response curve and to generate a control instruction corresponding to the input operation.

The control instruction performing module 830 is configured to control a terminal device in communication with the audio processing device according to the control instruction.

In the above-mentioned device for input operation control, when the user's input operation on the exhaust hole defined in the audio processing device is received, the frequency-response acquiring module 810 is configured to acquire the frequency-response curve associated with the acoustic structure of the audio processing device according to the audio signal currently played by the audio processing device. The control instruction generating module 820 is configured to recognize the input operation according to the frequency-response curve and to generate the control instruction corresponding to the input operation. The control instruction performing module 830 is configured to control the terminal device in communication with the audio processing device according to the control instruction. By the above-mentioned device, control for the terminal device can be realized according to the input operation on the exhaust hole defined in the audio processing device, thereby realizing convenient and quick user operations, and improving use efficiency and user experience.

In one implementation, the frequency-response acquiring module 810 is further configured to acquire the audio signal currently played by the audio processing device, to analyze frequency and amplitude of the audio signal, and to establish the frequency-response curve according to the frequency and amplitude of the audio signal.

In one implementation, the control instruction generating module 820 is further configured to establish a preset database for storing multiple preset frequency-response curves and to establish a mapping relationship between the multiple preset frequency-response curves and corresponding input operations. When the frequency-response curve is matched with one of the multiple preset frequency-response curves in the preset database, the control instruction generating module 820 is configured to recognize the input operation corresponding to the frequency-response curve according to the mapping relationship. The control instruction generating module 820 is configured to generate the control instruction corresponding to the input operation currently recognized according to the input operation and a corresponding relationship between input operations and control instructions.

In one implementation, the frequency-response acquiring module 810 is further configured to acquire a vibration signal of the audio processing device, to determine whether the vibration signal is generated by the user's input operation on the exhaust hole defined in the audio processing device according to feature information of the vibration signal, and to determine the frequency-response curve associated with the acoustic structure of the audio processing device according to the audio signal currently played by the audio processing device, based on a determination that the vibration signal is generated by the user's input operation.

In one implementation, the control instruction performing module 830 is further configured to recognize control information contained in the control instruction to determine in the terminal device a preset application to be controlled and an instruction interactive operation to be performed. The instruction interactive operation includes at least one of playing music, pausing music, switching songs, adjusting volume, opening a preset application, and activating a voice assistant.

The division of each module in the above-mentioned device for input operation control is merely for illustrative purposes. In other implementations, the device for input operation control may be divided into different modules as needed to complete all or part of the functions of the above-mentioned device for input operation control.

For the definition of the device for input operation control, reference may be made to the definition of the method for input operation control, and details are not described herein again. Each of the above-mentioned modules of the device for input operation control can be implemented in whole or in part by software, hardware, and combinations thereof. Each of the above modules may be embedded in or independent of the processor in the computer device, or may be stored in a memory of the computer device in a software form, so that the processor can invoke and execute the operations corresponding to the above modules.

The implementation of each module of the device for input operation control provided in the implementations of the present disclosure may be in the form of a computer program. The computer program can be run on a terminal device or a server. The program modules of the computer program may be stored in the memory of the terminal device or server. When the computer program is executed by the processor, the operations of the method for input operation control described in the implementations of the present disclosure are executed.

The implementations of the present disclosure further provide an earphone. The earphone includes an electroacoustic transducer, a memory, and a processor. The processor is electrically coupled with the electroacoustic transducer and the memory, and the memory is configured to store computer programs which, when executed by the processor, are configured to implement the method for input operation control provided in the above-mentioned implementations.

The implementations of the present disclosure further provide a computer readable storage medium. One or more non-transitory computer readable storage media contain computer executable instructions which, when executed by one or more processors, enables the processor to implement the method for input operation control provided in the above-mentioned implementations.

The implementations of the present disclosure further provide a computer program product. The computer program product contains instructions which, when executed by the computer, enables the computer to implement the method for input operation control provided in the above-mentioned implementations.

Figure 9:
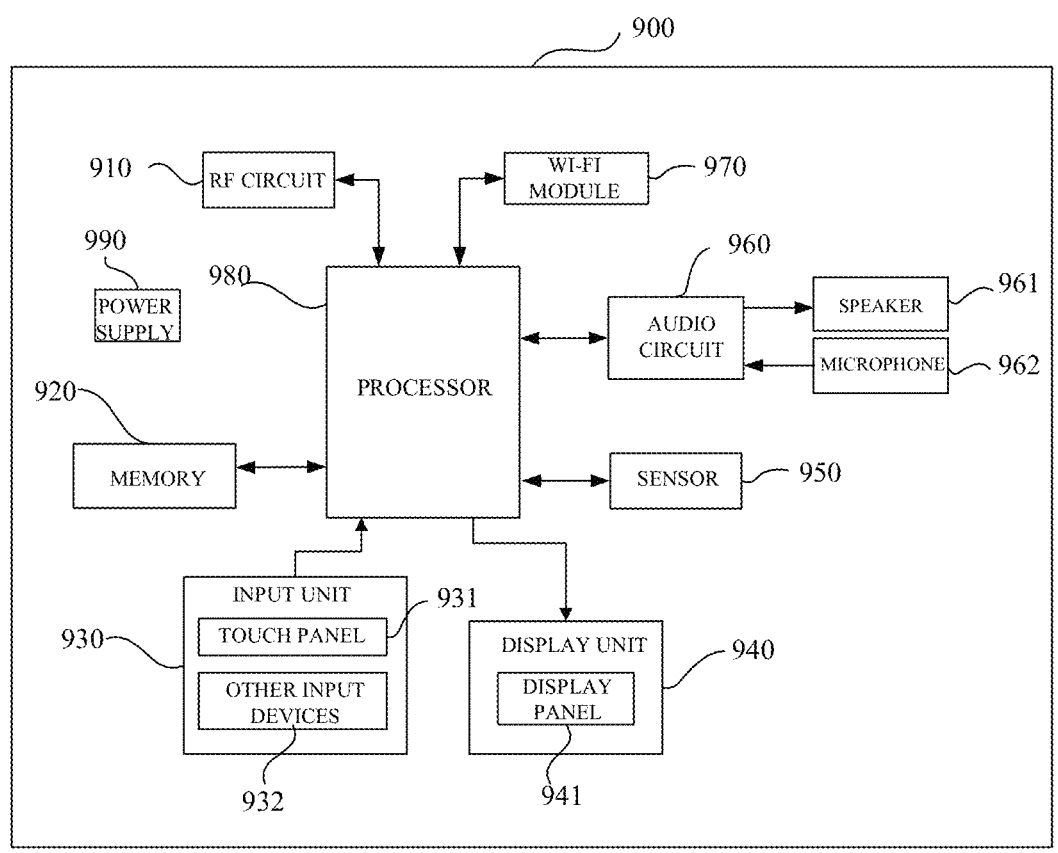
FIG. 9 is a block diagram illustrating part of a structure of a mobile phone related to a terminal device provided by an implementation of the present disclosure.

The implementations of the present disclosure further provide a terminal device. As illustrated in FIG. 9, only parts related to the implementations of the present disclosure are illustrated for convenience of description. For technical details not described, reference may be made to the method implementations of the present disclosure. The terminal device may be any terminal device such as a mobile phone, a tablet PC, a PDA, a point of sale electronic device (POS), an on-board computer, a wearable device, and the like. The following will describe the mobile phone as an example of the terminal device.

FIG. 9 is a block diagram of part of a structure of a mobile phone related to a terminal device provided by an implementation of the present disclosure. As illustrated in FIG. 9, the mobile phone includes radio frequency (RF) circuit 910, a memory 920, an input unit 930, a display unit 940, a sensor 950, an audio circuit 960, a wireless fidelity (Wi-Fi) module 970, a processor 980, a power supply 990, and other components. Those skilled in the art can understand that the structure of the mobile phone illustrated in FIG. 9 does not constitute any limitation on a mobile phone. The mobile phone configured to implement technical solutions of the present disclosure may include more or fewer components than illustrated, combine certain components, or have different component configuration.

The RF circuit 910 is configured to receive or transmit information, or receive or transmit signal during a call. The RF circuit 910 is configured to receive downlink information of a base station and transmit the downlink information to the processor 980 to be processed. In addition, the RF circuit 910 is configured to transmit uplink data to the base station. Generally, the RF circuit 910 includes but not limited to an antenna, at least one amplifier, a transceiver, a coupler, a low noise amplifier (LNA), a duplexer and the like. In addition, the RF circuit 910 may also communicate with the network and other devices via wireless communication. The above wireless communication may use any communication standard or protocol, which includes but not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 920 is configured to store software programs and modules. The processor 980 is configured to execute various function applications and data processing of the mobile phone by running the software programs and the modules stored in the memory 920. The memory 920 can mainly include a program storage area and a data storage area. The program storage area may store an operating system, applications required for at least one function (such as sound playback function, image playback function, etc.). The data storage area may store data (such as audio data, a phone book, etc.) created according to use of the mobile phone, and so on. In addition, the memory 920 may include a high-speed RAM, and may further include a non-transitory memory such as at least one disk storage device, a flash device, or other non-transitory solid storage devices.

The input unit 930 may be configured to receive input digital or character information and generate key signal input associated with user setting and function control of the mobile phone 900. In one implementation, the input unit 930 may include a touch panel 931 and other input devices 932. The touch panel 931 may be known as a touch screen, collect touch operations generated by the user touching the touch panel 931 or areas near the touch panel 931 (such as operations generated by the user using any suitable object or accessory such as a finger or a stylus to touch the touch panel 931 or areas near the touch panel 931), and drive a corresponding connection device according to a preset program. In one implementation, the touch panel 931 may include a touch detection device and a touch controller. The touch detection device is configured to detect the user's touch orientation and a signal brought by the touch operation, and transmit the signal to the touch controller. The touch controller is configured to receive the touch information from the touch detection device, convert the touch information into contact coordinates, and further transmit the contact coordinates to the processor 980. The touch controller can also receive and execute commands from the processor 980. In addition, the touch panel 931 may be implemented in various types such as resistive, capacitive, infrared, surface acoustic waves, etc. In addition to the touch panel 931, the input unit 930 may further include other input devices 932. The input devices 932 include, but are not limited to, one or more of a physical keyboard, function keys (such as volume control buttons, switch buttons, etc.).

The display unit 940 can be configured to display information input by the user, information provided for the user, or various menus of the mobile phone. The display unit 940 may include a display panel 941. In one implementation, the display panel 941 may be in the form of a liquid crystal display (LCD), an organic light-emitting diode (OLED) and so on. In one implementation, the touch panel 931 may cover the display panel 941. After the touch panel 931 detecting a touch operation on or near the touch panel 931, the touch panel 931 transmits the touch operation to the processor 980 to determine a type of the touch event, and then the processor 980 provides a corresponding visual output on the display panel 941 according to the type of the touch event. Although in FIG. 9, the touch panel 931 and the display panel 941 function as two independent components to implement the input and output functions of the mobile phone. In some implementations, the touch panel 931 and the display panel 941 may be integrated to achieve the input and output functions of the mobile phone.

The mobile phone 900 may further include at least one type of sensor 950, such as a light sensor, a motion sensor, and other sensors. In one implementation, the light sensor may include an ambient light sensor and a proximity sensor, among which the ambient light sensor may adjust the brightness of the display panel 941 according to ambient lights. The proximity sensor may turn off the display panel 941 and/or backlight when the mobile phone reaches nearby the ear. As a kind of motion sensor, a accelerometer sensor can detect the magnitude of acceleration in all directions and when the mobile phone is stationary, the accelerometer sensor can detect the magnitude and direction of gravity; the accelerometer sensor may also be configured for applications related to identification of mobile-phone gestures (such as vertical and horizontal screen switch), vibration-recognition related functions (such as a pedometer, percussion), and so on. The mobile phone may also be equipped with a gyroscope, a barometer, a hygrometer, a thermometer, an infrared sensor, and other sensors.

The audio circuit 960, a speaker 961, and a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals to output. On the other hand, the microphone 962 converts the received sound signals into electrical signals, which will be received and converted into audio data by the audio circuit 960 to output. The audio data is then processed by the processor 980 and transmitted via an RF circuit 910 to another mobile phone. Alternatively, the audio data is output to the memory 920 for further processing.

Wi-Fi belongs to a short-range wireless transmission technology. With aid of the Wi-Fi module 970, the mobile phone can assist the user in receiving and sending an E-mail, browsing through webpage, accessing streaming media, and the like. Wi-Fi provides users with wireless broadband Internet access. Although the Wi-Fi module 970 is illustrated in FIG. 9, it should be understood that the Wi-Fi module 970 is not necessary to the mobile phone 900 and can be omitted according to actual needs.

The processor 980 is a control center of the mobile phone. The processor 980 connects various parts of the entire mobile phone through various interfaces and lines. By running or executing software programs and/or modules stored in the memory 920 and calling data stored in the memory 920, the processor 980 can execute various functions of the mobile phone and conduct data processing, so as to monitor the mobile phone as a whole. The processor 980 can include at least one processing unit. In one implementation, the processor 980 can integrate an application processor and a modem processor, where the application processor is mainly configured to handle an operating system, a user interface, applications, and so on and the modem processor is mainly configured to deal with wireless communication. It will be appreciated that the modem processor mentioned above may not be integrated into the processor 980. For example, the processor 980 can integrate an application processor and a baseband processor, and the baseband processor and other peripheral chips can form a modem processor. The mobile phone 900 further includes a power supply 990 (such as a battery) that supplies power to various components. For instance, the power supply 990 may be logically coupled to the processor 980 via a power management system to enable management of charging, discharging, and power consumption through the power management system.

In one implementation, the mobile phone 900 may further include a camera, a Bluetooth® module, and so on.

In the implementation of the present disclosure, the processor 980 included in the mobile phone 900 implements the method for input operation control described above when executing computer programs stored in the memory.

When the computer programs running on the processor 980 is executed, the instruction interactive operation for the terminal device can be realized according to the input operation on the exhaust hole in the audio processing device, thereby realizing convenient and quick user operations, and improving use efficiency and user experience.

Any reference to a memory, storage, database, or other medium used herein can include non-transitory and/or transitory memory. Suitable non-transitory memories can include ROM, programmable ROM (PROM), electrically programmable ROM (EPROM), electrically erasable programmable ROM (EEPROM), or flash memory. Transitory memory can include RAM, which acts as an external cache. By way of illustration and not limitation, RAM is available in a variety of formats, such as static RAM (SRAM), dynamic RAM (DRAM), synchronous DRAM (SDRAM), double data rate SDRAM (DDR SDRAM), enhanced SDRAM (ESDRAM), synchronization link DRAM (SLDRAM), Rambus direct RAM (RDRAM), direct Rambus dynamic RAM (DRDRAM), and Rambus dynamic RAM (RDRAM).

The above implementations are merely illustrative of several implementations of the present disclosure. The description thereof is specific and detailed, but is not to be construed as limiting the scope of the claims. It should be noted that, various variations and modifications may be made by those skilled in the art without departing from the spirit and scope of the present disclosure. Therefore, the scope of the present disclosure should be determined by the appended claims.

What is claimed is:

1. A method for input operation control, comprising:
   receiving an input operation on an exhaust hole defined in an audio processing device communicating with a terminal device, wherein the audio processing device is detachably coupled to the terminal device;
   acquiring a frequency-response curve associated with an acoustic structure of the audio processing device according to an audio signal currently played by the audio processing device;
   recognizing the input operation according to the frequency-response curve;
   generating a control instruction corresponding to the input operation, wherein a corresponding relationship between input operations and control instructions used for controlling the terminal device is preset via a user interface displayed on the terminal device; and
   controlling the terminal device in communication with the audio processing device according to the control instruction;
   wherein receiving the input operation on the exhaust hole defined in the audio processing device comprises:
      acquiring a vibration signal of the audio processing device; and
      determining whether the vibration signal is generated by the input operation on the exhaust hole defined in the audio processing device according to feature information of the vibration signal; and
   acquiring the frequency-response curve associated with the acoustic structure of the audio processing device according to the audio signal currently played by the audio processing device comprises:
      determining the frequency-response curve associated with the acoustic structure of the audio processing device according to the audio signal currently played by the audio processing device, based on a determination that the vibration signal is generated by the input operation.

2. The method of claim 1, wherein acquiring the frequency-response curve associated with the acoustic structure of the audio processing device according to the audio signal currently played by the audio processing device comprises:
   acquiring the audio signal currently played by the audio processing device;
   analyzing frequency and amplitude of the audio signal; and
   establishing the frequency-response curve according to the frequency and amplitude of the audio signal.

3. The method of claim 1, wherein recognizing the input operation according to the frequency-response curve comprises:
   recognizing the input operation according to the frequency-response curve and a mapping relationship between input operations and a plurality of preset frequency-response curves stored in a preset database; and
   generating the control instruction corresponding to the input operation comprises:
   generating the control instruction corresponding to the input operation according to the input operation and the corresponding relationship between the input operations and the control instructions.

4. The method of claim 3, wherein the input operation is at least one of covering the exhaust hole for a preset duration and performing covering the exhaust hole preset times within a preset period.

5. The method of claim 1, wherein controlling the terminal device in communication with the audio processing device according to the control instruction comprises:
   recognizing control information contained in the control instruction to determine a preset application to be controlled and an instruction interactive operation to be performed; and
   controlling the preset application to perform the instruction interactive operation.

6. The method of claim 5, wherein the instruction interactive operation comprises at least one of playing music, pausing music, switching songs, adjusting volume, opening a preset application, and activating a voice assistant.

7. An earphone, comprising:
   at least one processor; and
   a computer readable memory, coupled with the at least one processor and storing at least one computer executable instruction therein which, when executed by the at least one processor, causes the at least one processor to carry out actions, comprising:
      receiving an input operation on an exhaust hole defined in the earphone communicating with a terminal device, wherein the earphone is detachably coupled to the terminal device;
      acquiring a frequency-response curve associated with an acoustic structure of the earphone according to an audio signal currently played by the earphone;
      recognizing the input operation according to the frequency-response curve;
      generating a control instruction corresponding to the input operation, wherein a corresponding relationship between input operations and control instructions used for controlling the terminal device is preset via a user interface displayed on the terminal device; and controlling the terminal device in communication with the earphone according to the control instruction;

wherein the at least one processor carrying out the action of receiving the input operation on the exhaust hole defined in the earphone is caused to carry out actions, comprising:
acquiring a vibration signal of the earphone; and
determining whether the vibration signal is generated by the input operation on the exhaust hole defined in the earphone according to feature information of the vibration signal; and the at least one processor carrying out the action of acquiring the frequency-response curve associated with the acoustic structure of the earphone according to the audio signal currently played by the earphone is caused to carry out an action, comprising:
determining the frequency-response curve associated with the acoustic structure of the earphone according to the audio signal currently played by the earphone, when the vibration signal is generated by the input operation.

8. The earphone of claim 7, wherein the at least one processor carrying out the action of acquiring the frequency-response curve associated with the acoustic structure of the earphone according to the audio signal currently played by the earphone is caused to carry out actions, comprising:
acquiring the audio signal currently played by the earphone;
analyzing frequency and amplitude of the audio signal; and
establishing the frequency-response curve according to the frequency and amplitude of the audio signal.

9. The earphone of claim 7, wherein the at least one processor carrying out the action of recognizing the input operation according to the frequency-response curve is caused to carry out an action, comprising:
recognizing the input operation according to the frequency-response curve and a mapping relationship between input operations and a plurality of preset frequency-response curves stored in a preset database; and
the at least one processor carrying out the action of generating the control instruction corresponding to the input operation further is caused to carry out an action, comprising:
generating the control instruction corresponding to the input operation according to the input operation and the corresponding relationship between the input operations and the control instructions.

10. The earphone of claim 9, wherein the input operation is at least one of covering the exhaust hole for a preset duration and performing covering the exhaust hole preset times within a preset period.

11. The earphone of claim 7, wherein the at least one processor carrying out the action of controlling the terminal device in communication with the earphone according to the control instruction is caused to carry out actions, comprising:
recognizing control information contained in the control instruction to determine a preset application to be controlled and an instruction interactive operation to be performed; and
controlling the preset application to perform the instruction interactive operation.

12. The earphone of claim 11, wherein the instruction interactive operation comprises at least one of playing music, pausing music, switching songs, adjusting volume, opening a preset application, and activating a voice assistant.

13. A terminal device, comprising:
at least one processor; and
a computer readable memory, coupled with the at least one processor and storing at least one computer executable instruction therein which, when executed by the at least one processor, causes the at least one processor to carry out actions, comprising:
receiving an input operation on an exhaust hole defined in an audio processing device in communication with the terminal device, wherein the audio processing device is detachably coupled to the terminal device;
acquiring a frequency-response curve associated with an acoustic structure of the audio processing device according to an audio signal currently played by the audio processing device;
recognizing the input operation according to the frequency-response curve;
generating a control instruction corresponding to the input operation, wherein a corresponding relationship between input operations and control instructions used for controlling the terminal device is preset via a user interface displayed on the terminal device; and
performing an instruction interactive operation according to the control instruction;
wherein the at least one processor carrying out the action of receiving the input operation on the exhaust hole defined in the audio processing device is caused to carry out actions, comprising:
acquiring a vibration signal of the audio processing device; and
determining whether the vibration signal is generated by the input operation on the exhaust hole defined in the audio processing device according to feature information of the vibration signal; and
the at least one processor carrying out the action of acquiring the frequency-response curve associated with the acoustic structure of the audio processing device according to the audio signal currently played by the audio processing device is caused to carry out an action, comprising:
determining the frequency-response curve associated with the acoustic structure of the audio processing device according to the audio signal currently played by the audio processing device, based on a determination that the vibration signal is generated by the input operation.

14. The terminal device of claim 13, wherein the at least one processor carrying out the action of acquiring the frequency-response curve associated with the acoustic structure of the audio processing device according to the audio signal currently played by the audio processing device is caused to carry out actions, comprising:
acquiring the audio signal currently played by the audio processing device;
analyzing frequency and amplitude of the audio signal; and
establishing the frequency-response curve according to the frequency and amplitude of the audio signal.

15. The terminal device of claim 13, wherein the at least one processor carrying out the action of recognizing the input operation according to the frequency-response curve is caused to carry out an action, comprising:

recognizing the input operation according to the frequency-response curve and a mapping relationship between input operations and a plurality of preset frequency-response curves stored in a preset database; and the at least one processor carrying out the action of generating the control instruction corresponding to the input operation is caused to carry out an action, comprising:

generating the control instruction corresponding to the input operation according to the input operation and the corresponding relationship between the input operations and the control instructions.

16. The terminal device of claim 15, wherein the input operation is at least one of covering the exhaust hole for a preset duration and performing covering the exhaust hole preset times within a preset period.

17. The terminal device of claim 13, wherein the at least one processor carrying out the action of performing the instruction interactive operation according to the control instruction is caused to carry out actions, comprising:

recognizing control information contained in the control instruction to determine a preset application to be controlled and the instruction interactive operation; and controlling the preset application to perform the instruction interactive operation.

* * * * *